US011837767B2

(12) United States Patent
Liu et al.

(10) Patent No.: US 11,837,767 B2
(45) Date of Patent: Dec. 5, 2023

(54) ELECTROLYTE COMPOSITIONS FOR REDOX FLOW BATTERIES

(71) Applicant: UOP LLC, Des Plaines, IL (US)

(72) Inventors: Chunqing Liu, Arlington Heights, IL (US); Xueliang Dong, Schaumburg, IL (US); Chaoyi Ba, Schaumburg, IL (US); Stuart R. Miller, Arlington Heights, IL (US); James H. K. Yang, Arlington Heights, IL (US)

(73) Assignee: UOP LLC, Des Plaines, IL (US)

( * ) Notice: Subject to any disclaimer, the term of this patent is extended or adjusted under 35 U.S.C. 154(b) by 176 days.

(21) Appl. No.: 17/388,962

(22) Filed: Jul. 29, 2021

(65) Prior Publication Data

US 2022/0200030 A1 Jun. 23, 2022

Related U.S. Application Data

(60) Provisional application No. 63/129,979, filed on Dec. 23, 2020.

(51) Int. Cl.
*H01M 8/18* (2006.01)
*H01M 8/08* (2016.01)

(52) U.S. Cl.
CPC ............. *H01M 8/188* (2013.01); *H01M 8/08* (2013.01); *H01M 2300/0005* (2013.01)

(58) Field of Classification Search
CPC .... H01M 8/0239; H01M 8/0245; H01M 8/08; H01M 8/18–188; H01M 8/20; H01M 2300/0005
See application file for complete search history.

(56) References Cited

U.S. PATENT DOCUMENTS

| | | | |
|---|---|---|---|
| 3,790,610 A | 2/1974 | Lum et al. | |
| 4,167,214 A | 9/1979 | Street, Jr. | |
| 4,814,241 A * | 3/1989 | Nagashima | H01M 8/188 429/204 |
| 6,468,688 B2 | 10/2002 | Kazacos et al. | |
| 9,865,895 B2 | 1/2018 | Evans et al. | |
| 10,586,996 B2 | 3/2020 | Evans et al. | |
| 2014/0057154 A1 | 2/2014 | Timmons | |
| 2014/0227574 A1* | 8/2014 | Savinell | H01M 8/04186 429/105 |
| 2018/0241065 A1* | 8/2018 | Schubert | H01M 8/188 |
| 2019/0067725 A1* | 2/2019 | Wainright | H01M 4/8657 |
| 2019/0326578 A1 | 10/2019 | Frischmann et al. | |
| 2020/0052317 A1 | 2/2020 | Song | |
| 2021/0098809 A1* | 4/2021 | Brett | H01M 8/0228 |

FOREIGN PATENT DOCUMENTS

| | | | |
|---|---|---|---|
| CN | 109659469 A | | 4/2019 |
| KR | 101812739 B1 * | | 12/2017 |
| WO | 2019118662 A1 | | 6/2019 |

OTHER PUBLICATIONS

International Search Report from corresponding PCT application No. PCT/US2021/072182 dated Feb. 10, 2022.
Written Opinion from corresponding PCT application No. PCT/US2021/072182 dated Feb. 10, 2022.
Yensen, Nicholas et al., Open source all-iron batter for renewable energy storage, HardwareX 6 (2019).
Tucker, Michael C. et al., All-Iron Redox Flow Battery Tailored for Off-Grid Portable Applications, ChemSusChem 8(23) Dec. 1, 2015.
Zhang, Hongzhang et al., Nanofiltration (NF) membranes: the next generation separators for all vanadium redox flow batteries (VRBs)?, Energy Environ.Sci., 2011, 4, 1676.
Teng, Xiangguo et al., Nafion/organically modified silicate hybrids membrane for vanadium redox flow battery, Journal of Power Sources 189 (2009), 1240-1246.
Chieng, S.C. et al., Modification of Daramic, microporous separator, for redox flow battery applications, Journal of Membrane Science, 75 (1992) 81-91.
Wei, Xiaoliang et al., Micropourous separators for Fe/V redox flow batteries, Journal of Power Sources 218 (2012) 39-45.
Gubler, Lorenz, Membranes and separators for redox flow batteries, Current Opinion in Electrochemistry 2019, 18:31-36.
Mohammadi, T. et al., Use of polyelectrolyte for incorporation of ion-exchange groups in composite membranes for vanadium redox flow battery application, Journal of Power Sources 56 (1995) 91-96.
Mohammadi, T. et al., Evaluation of the chemical stability of some membranes in vanadium solution, Journal of Applied Electrochemistry 27 (1997) 153-160.
Ding, Cong et al., Vanadium Flow Battery for Energy Storage: Prospects and Challenges, The Journal of Physical Chemistry Letters, 2013, 4, 1281-1294.
Varco, John R. et al., Anion-exchange membranes in electrochemical energy systems, Energy Environ. Sci., 2014, 7, 3135-3191.
Shi, Yu et al, Recent development of membrane for vanadium redox flow battery applications: A review, Applied Energy 238 (2019) 202-224.

(Continued)

*Primary Examiner* — Scott J. Chmielecki

(57) ABSTRACT

Stable and high performance positive and negative electrolytes compositions to be used in redox flow battery systems are described. The redox flow battery system, comprises: at least one rechargeable cell comprising a positive electrolyte, a negative electrolyte, and an ionically conductive membrane positioned between the positive electrolyte and the negative electrolyte, the positive electrolyte in contact with a positive electrode, and the negative electrolyte in contact with a negative electrode. The positive electrolyte consists essentially of water, a first amino acid, an inorganic acid, an iron precursor, a supporting electrolyte, and optionally a boric acid. The negative electrolyte consists essentially of water, the iron precursor, the supporting electrolyte, and a negative electrolyte additive. The iron precursor is $FeCl_2$, $FeCl_3$, $FeSO_4$, $Fe_2(SO_4)_3$, $FeO$, $Fe$, $Fe_2O_3$, or combinations thereof. The supporting electrolyte is $LiCl$, $NaCl$, $Na_2SO_4$, $KCl$, $NH_4Cl$, or combinations thereof. The negative electrolyte additive is boric acid or a combination of the boric acid and a second amino acid.

17 Claims, No Drawings

(56) References Cited

OTHER PUBLICATIONS

Zhang, Hongzhang et al., Silica modified nanofiltration membranes with improved selectivity for redox flow battery application, Energy Environ. Sci., 2012, 5, 6299.
Mohammadi, T. et al., Use of polyelectrolyte for incorporation if ion-exchange groups in composite membranes for vanadium redox flow battery applications, Journal of Power Sources 56 (1995) 91-96.
Modiba, Portia et al., Electrochemical impedance spectroscopy of Ce(IV) with aminopolycarboxylate ligands for redox flow batteries applications, Journal of Power Sources 205 (2012) 1-9.

* cited by examiner

ELECTROLYTE COMPOSITIONS FOR REDOX FLOW BATTERIES

RELATED APPLICATIONS

This application claims the benefit of U.S. Provisional Patent Application Ser. No. 63/129,979 filed Dec. 23, 2020, the entirety of which is incorporated herein by reference.

BACKGROUND OF THE INVENTION

Energy storage systems have played a key role in harvesting energy from various sources. The energy storage systems can be used to store energy and convert it for use in many different applications, such as building, transportation, utility, and industry. A variety of energy storage systems have been used commercially, and new systems are currently being developed. Energy storage types can be categorized as electrochemical and battery, thermal, thermochemical, flywheel, compressed air, pumped hydropower, magnetic, biological, chemical and hydrogen energy storages. The development of cost-effective and eco-friendly energy storage systems is needed to solve the energy crisis and to overcome the mismatch between generation and end use.

Renewable energy sources, such as wind and solar power, have transient characteristics, which require energy storage. Renewable energy storage systems such as redox flow batteries (RFBs) have attracted significant attention for electricity grid, electric vehicles, and other large-scale stationary applications. RFB is an electrochemical energy storage system that reversibly converts chemical energy directly to electricity. The conversion of electricity via water electrolysis into hydrogen as an energy carrier without generation of carbon monoxide or dioxide as byproducts enables a coupling of the electricity, chemical, mobility, and heating sectors. Water electrolysis produces high quality hydrogen by electrochemical splitting of water into hydrogen and oxygen. Water electrolysis has zero carbon footprint when the process is operated by renewable power sources, such as wind, solar, or geothermal energy. The main water electrolysis technologies include alkaline electrolysis, polymer electrolyte membrane (PEM) electrolysis, and solid oxide electrolysis. PEM water electrolysis is one of the favorable methods for conversion of renewable energy to high purity hydrogen with the advantages of compact design, high current density, high efficiency, fast response, small footprint, lower temperature (20-90° C.) operation, and high purity oxygen byproduct.

RFBs are composed of two external storage tanks filled with active materials comprising metal ions that may be in different valence states, two circulation pumps, and a flow cell with a separation membrane. The separation membrane is located between the anode and the cathode and is used to separate the anolyte and the catholyte, as well as to utilize the current circuit by allowing the transfer of balancing ions. Among all the redox flow batteries developed to date, all vanadium redox flow batteries (VRFB) have been the most extensively studied. VRFB uses the same vanadium element in both half cells which prevents crossover contamination of electrolytes from one half cell to the other half cell. VRFB, however, is inherently expensive due to the use of high cost vanadium and an expensive membrane. All-iron redox flow batteries (IFB) are particularly attractive for grid scale storage applications due to the use of low cost and abundantly available iron, salt, and water as the electrolyte and the non-toxic nature of the system.

The membrane is one of the key materials that make up a battery or electrolysis cell as a key driver for safety and performance. Some important properties for membranes for flow batteries, fuel cells, and membrane electrolysis include high conductivity, high ionic permeability (porosity, pore size and pore size distribution), high ionic exchange capacity (for ion-exchange membrane), high ionic/electrolyte selectivity (low permeability/crossover to electrolytes), low price (less than $150-200/m$^2$), low area resistance to minimize efficiency loss resulting from ohmic polarization, high resistance to oxidizing and reducing conditions, chemically inert to a wide pH range, high thermal stability together with high proton conductivity (greater than or equal to 120° C. for fuel cell), high proton conductivity at high T without $H_2O$, high proton conductivity at high T with maintained high RH, and high mechanical strength (thickness, low swelling).

The two main types of membranes for redox flow battery, fuel cell, and electrolysis applications are polymeric ion-exchange membranes and microporous separators. The polymeric ion-exchange membranes can be cation-exchange membranes comprising $—SO_3^-$, $—COO^-$, $—PO_3^{2-}$, $—PO_3H^-$, or $—C_6H_4O^-$ cation exchange functional groups, anion-exchange membranes comprising $—NH_3^+$, $—NRH_2^+$, $—NR_2H^+$, $—NR_3^+$, or $—SR_2^-$ anion exchange functional groups, or bipolar membranes comprising both cation-exchange and anion-exchange polymers. The polymers for the preparation of ion-exchange membranes can be perfluorinated ionomers such as Nafion®, Flemion®, and NEOSEPTA®-F, partially fluorinated polymers, non-fluorinated hydrocarbon polymers, non-fluorinated polymers with aromatic backbone, or acid-base blends. In general, perfluorosulfonic acid (PFSA)-based membranes, such as Nafion® and Flemion®, are used in vanadium redox flow battery (VRFB) systems due to their oxidation stability, good ion conductivity, unique morphology, mechanical strength, and high electrochemical performance. However, these membranes have low balancing ions/electrolyte metal ion selectivity, and high electrolyte metal ion crossover which causes capacity decay in VRFBs, and they are expensive.

The microporous and nanoporous membrane separators can be inert microporous/nanoporous polymeric membrane separators, inert non-woven porous films, or polymer/inorganic material coated/impregnated separators. The inert microporous/nanoporous polymeric membrane separators can be microporous polyethylene (PE), polypropylene (PP), PE/PP, or composite inorganic/PE/PP membrane, inert non-woven porous films, non-woven PE, PP, polyamide (PA), polytetrafluoroethylene (PTFE), polyvinyl chloride (PVC), polyvinylidene fluoride (PVDF), polyethylene terephalate (PET), or polyester porous film. For example, microporous Daramic® and Celgard® membrane separators made from PE or PP polymer are commercially available. They normally have high ionic conductivity, but also high electrolyte cross-over for RFB applications.

Another important component in redox flow batteries (RFBs) is the electrolyte solution. Typical electrolyte solutions may include electrolytes, supporting redox inactive electrolytes, and electrolyte additives. All-iron RFBs have iron in different valence states as both the positive and negative electrolytes for the positive and negative electrodes, respectively. The supporting redox inactive electrolytes for all-iron RFBs can be NaCl, KCl, $NH_4Cl$, or $Na_2SO_4$. The positive electrolyte, negative electrolyte, positive electrode, and negative electrode may also be referred to as redox electrolyte or catholyte, plating electrolyte or anolyte, redox electrode or cathode, and plating electrode or anode, respectively. The iron-based positive and negative electrolyte solutions stored in the external storage tanks flow through the stacks of the batteries. The cathode side half-cell reaction involves $Fe^{2+}$ losing electrons to form $Fe^{2+}$ during charge and $Fe^{3+}$ gaining electrons to form $Fe^{2+}$ during discharge; the reaction is given by Eq. 1. The anode side half-cell reaction involves the deposition and dissolution of iron in the form of a solid plate; the reaction is given by Eq. 2. The overall reaction is shown in Eq. 3.

$$\text{Redox electrode: } 2Fe^{2+} \leftrightarrow Fe^{3+} + 2e^- + 0.77V \quad (1)$$

$$\text{Plating electrode: } Fe^{2+} + 2e^- \leftrightarrow Fe^0 - 0.44V \quad (2)$$

$$\text{Total: } 3Fe^{2+} \leftrightarrow Fe^0 + 2Fe^{3+} 1.21V \quad (3)$$

All-iron RFB systems have been studied for grid-level energy storage. However, hydrogen evolution is one of the major issues for all-iron RFBs, which results in reduction in coulombic efficiency at the cathode of the all-iron RFB. Electrolyte additives such as ethylenediaminetetraacetic acid complexing ligand have been studied to raise the pH of the electrolytes and reduce hydrogen evolution (J. Power Sources, 2012, 205, 1-9). Other problems for all-iron RFBs are the pH discrepancy between the positive and negative electrolyte solutions, and $Fe^{3+}$ crossover from the positive electrolyte side to the negative electrolyte side. A pH of less than 1 for the positive electrolyte solution and a pH of 1-4 for the negative electrolyte solution are normally used for all-iron RFBs to achieve high redox reaction kinetics and high Fe plating efficiency. The $Fe^{3+}$ crossover from the positive electrolyte solution with lower pH to the negative electrolyte solution with higher pH through the membrane causes $Fe(OH)_3$ formation and precipitation, which results in unstable battery performance with membrane contamination and the increase of the membrane ohmic resistance. U.S. Pat. No. 9,865,895 disclosed the use of organic acids such as L-ascorbic acid or citric acid as the electrolyte additives to control the pH of the electrolytes and reduce ferric ion crossover from the positive electrolyte to the negative electrolyte by forming large complexes with ferric and ferrous ions. However, electrolyte stability can be an issue for electrolyte storage and long term battery operation. Some electrolyte solutions containing L-ascorbic acid electrolyte additive will change color over time, indicating degradation of the electrolyte solution. In addition, the degradation may involve generation of CO. U.S. Pat. No. 10,586,996 disclosed the use of boric acid in the electrolyte solution to hinder the evolution of hydrogen. US 2020/0052317 disclosed the addition of steric acid as a plating additive to the negative electrolyte solution to improve Fe plating quality and therefore the performance of the battery system.

The design of all-iron RFBs, particularly the compositions of the electrolyte solutions, the separation membrane, and the electrodes, is an important factor in determining the total amount of energy that can be stored in the battery system. The compositions of the positive and negative electrolyte solutions significantly influence the performance and the cost of the all-iron RFBs.

Despite the significant research efforts, the wide adoption of redox flow batteries for grid energy storage applications is still a challenge.

Therefore, there is a need for stable, high performance positive and negative electrolyte solutions for redox flow battery applications to improve voltage efficiency (VE), coulombic efficiency (CE), and energy efficiency (EE) of the redox flow batteries.

DESCRIPTION OF THE INVENTION

This invention relates to stable and high performance positive and negative electrolyte compositions for use in redox flow battery systems, particularly for all-iron redox flow battery systems. The positive electrolyte compositions contain an amino acid, but not other organic acids which lead to degradation of the solution (as seen by color change and/or evolution of CO), such as ascorbic acid. The negative electrolyte compositions may contain an amino acid, but do not contain other organic acids which lead to degradation of the solution (as seen by color change and/or evolution of CO), such as ascorbic acid. The electrolyte compositions comprising an iron precursor, a supporting electrolyte, a first amino acid, and an inorganic acid in the positive electrolyte solution, and the iron precursor, the supporting electrolyte, and a negative electrolyte additive selected from boric acid, and optionally a second amino acid in the negative electrolyte solution improved the performance of redox flow batteries compared with the electrolyte compositions without the first amino acid in the positive electrolyte solution, or without the negative electrolyte additive in the negative electrolyte solution, or without both the first amino acid in the positive electrolyte solution and without the negative electrolyte additive in the negative electrolyte solution.

The redox flow battery system comprises: at least one rechargeable cell comprising a positive electrolyte, a negative electrolyte, and an ionically conductive membrane positioned between the positive electrolyte and the negative electrolyte, the positive electrolyte in contact with a positive electrode, and the negative electrolyte in contact with a negative electrode.

The operating temperature of the redox flow battery system is in a range of 10° C. to 90° C., or 20° C. to 65° C.

The positive electrolyte consists essentially of water, a first amino acid, an inorganic acid, an iron precursor, a supporting electrolyte, and optionally boric acid. The iron precursor is $FeCl_2$, $FeCl_3$, $FeSO_4$, $Fe_2(SO_4)_3$, FeO, Fe, $Fe_2O_3$, or combinations thereof. The supporting electrolyte is LiCl, NaCl, $Na_2SO_4$, KCl, $NH_4Cl$, or combinations thereof.

Suitable first amino acids include, but are not limited to, glycine, aspartate, asparagine, glutamate, glutamine, alanine, valine, leucine, isoleucine, methionine, serine, cysteine, threonine, or combinations thereof.

Suitable inorganic acids include, but are not limited to, HCl, $H_2SO_4$, $H_3PO_4$, or combinations thereof.

The concentration of the first amino acid is typically in the range of 0.01 to 3.0 M, or 0.1 to 1.0 M. The concentration of the inorganic acid is typically in the range of 0.05 to 2.5 M, or 0.05 to 1.0 M. The concentration of the iron precursor is typically in the range of 1.0-4.5 M, or 1.5-3.0 M. The concentration of the supporting electrolyte is typically in the range of 1.0-4.0 M, or 2.0-4.0 M. The concentration of the optional boric acid is typically in the range of 0.01-1.0 M, or 0.05 to 0.5 M.

The negative electrolyte consists essentially of water, the iron precursor, the supporting electrolyte, and a negative electrolyte additive at a concentration of 0.01-2.0 M. The iron precursor is $FeCl_2$, $FeCl_3$, $FeSO_4$, $Fe_2(SO_4)_3$, FeO, Fe, $Fe_2O_3$, or combinations thereof. The supporting electrolyte is LiCl, NaCl, $Na_2SO_4$, KCl, $NH_4Cl$, or combinations thereof. The negative electrolyte additive is boric acid or a combination of boric acid and a second amino acid.

Suitable second amino acids include, but are not limited to, glycine, aspartate, asparagine, glutamate, glutamine, alanine, valine, leucine, isoleucine, methionine, serine, cysteine, threonine, or combinations thereof. In some embodiments, there is no second amino acid.

The concentration of the iron precursor is typically in the range of 1.0-4.5 M, or 1.5-3.0 M. The concentration of the supporting electrolyte is typically in the range 1.0-4.0 M, or 2.0-4.0 M. The concentration of the negative electrolyte additive is typically in the range of 0.01-2.0 M, or 0.05-0.5 M.

The iron precursors in the positive electrolyte and the negative electrolyte may be the same or different. The concentrations of the iron precursors in the positive electrolyte and the negative electrolyte may be the same or different.

The supporting electrolyte in the positive electrolyte and the negative electrolyte may be the same or different. The concentrations of the supporting electrolyte in the positive electrolyte and the negative electrolyte may be the same or different.

In some embodiments, the first amino acid and the second amino acid are the same, although they could be different.

In some embodiments, there is boric acid in the positive and negative electrolytes.

In some embodiments, there is amino acid in the positive and negative electrolytes.

In some embodiments, the pH of the positive electrolyte is in a range of −1 to 3, or 0 to 2, or 0.5 to 2.

In some embodiments, pH of the negative electrolyte is in a range of 0 to 5, or 1 to 4.5.

One example of a suitable positive electrolyte consists essentially of $FeCl_2$ at a concentration of 1.0-4.5 M, KCl at a concentration of 1.0-3.5 M, HCl at a concentration of 0.05-2.5 M, and glycine at a concentration of 0.01-3.0 M, optionally boric acid at a concentration of 0.01-1.0 M, and optionally $FeCl_3$ at a concentration of 0.1-1.0 M.

Another example of a suitable positive electrolyte consists essentially of $FeCl_2$ at a concentration of 1.0-4.5 M, $NH_4Cl$ at a concentration of 1.0-4.0 M, HCl at a concentration of 0.05-2.5 M, and glycine at a concentration of 0.01-3.0 M, optionally boric acid at a concentration of 0.01-1.0 M, and optionally $FeCl_3$ at a concentration of 0.1-1.0 M.

One example of a negative electrolyte consists essentially of $FeCl_2$ at a concentration of 1.0-4.5 M, KCl at a concentration of 1.0-3.5 M, and boric acid at a concentration of 0.01-1.0 M, optionally glycine at a concentration of 0.01-3.0 M, and optionally $FeCl_3$ at a concentration of 0.1-1.0 M.

Another example of a negative electrolyte consists essentially of $FeCl_2$ at a concentration of 1.0-4.5 M, $NH_4Cl$ at a concentration of 1.0-4.0 M, and boric acid at a concentration of 0.01-1.0 M, optionally glycine at a concentration of 0.01-3.0 M, and optionally $FeCl_3$ at a concentration of 0.1-1.0 M.

The ionically conductive membrane can be any ionically conductive membrane. Suitable ionically conductive membranes include, but are not limited to, an ionically conductive thin film composite (TFC) membrane comprising a microporous support membrane and a hydrophilic ionomeric polymer coating layer on a surface of the microporous support membrane, wherein the hydrophilic ionomeric polymer coating layer is ionically conductive, a cation-exchange membrane comprising $-SO_3^-$, $-COO^-$, $-PO_3^{2-}$, $-PO_3H^-$, or $-C_6H_4O^-$ cation exchange functional groups, an anion-exchange membrane comprising $-NH_3^+$, $-NRH_2^+$, $-NR_2H^+$, $-NR_3^+$, or $-SR_2^-$ anion exchange functional groups, or a bipolar membrane comprising both cation-exchange and anion-exchange polymers. The cation-exchange membrane can comprise a perfluorinated ionomer selected from, but is not limited to, Nafion®, Flemion®, NEOSEPTA®-F, a partially fluorinated polymer, a non-fluorinated hydrocarbon polymer, a non-fluorinated polymer with aromatic backbone, an acid-base blend, or combinations thereof.

One example of a suitable ionically conductive membrane comprises an ionically conductive thin film composite (TFC) membrane comprising a microporous support membrane and a hydrophilic ionomeric polymer coating layer on a surface of the microporous support membrane, wherein the hydrophilic ionomeric polymer coating layer is ionically conductive. The TFC membrane is described in U.S. Provisional Application 63/109,683, filed Nov. 4, 2020, entitled Ionically Conductive Thin Film Composite Membranes for Energy Storage Applications, which is incorporated herein by reference in its entirety.

The hydrophilic ionomeric polymer on the ionically conductive TFC membrane comprises a hydrophilic ionomeric polymer or a cross-linked hydrophilic polymer comprising repeat units of both electrically neutral repeating units and a fraction of ionized functional groups such as $-SO_3^-$, $-COO^-$, $-PO_3^{2-}$, $-PO_3H^-$, $-C_6H_4O^-$, $-O_4B^-$, $-NH_3^+$, $-NRH_2^+$, $-NR_2H^+$, $-NR_3^+$, or $-SR_2^-$. The hydrophilic ionomeric polymer is contains high water affinity polar or charged functional groups such as $-SO_3^-$, $-COO^-$ or $-NH_3^+$ group. The cross-linked hydrophilic polymer comprises a hydrophilic polymer complexed with a complexing agent such as polyphosphoric acid, boric acid, a metal ion, or a mixture thereof. The hydrophilic ionomeric polymer not only has high stability in an aqueous electrolyte solution due to its insolubility in the aqueous electrolyte solution, but also has high affinity to water and charge-carrying ions such as $H_3O^+$ or $Cl^-$ due to the hydrophilicity and ionomeric property of the polymer and therefore high ionic conductivity and low membrane specific area resistance.

The hydrophilic ionomeric polymer coating layer on the ionically conductive TFC membrane comprises a dense layer with a thickness typically in the range of about 1 micrometer to about 100 micrometers, or in the range of about 5 micrometers to about 50 micrometers. The dense hydrophilic ionomeric polymer coating layer forms very small nanopores with a pore size less than 0.5 nm in the presence of liquid water or water vapor, and in some cases combined with the existence of a cross-linked polymer structure via the complexing agent to control the swelling degree of the polymer, this results in high selectivity of charge-carrying ions such as protons, hydrated protons, chloride ions, potassium ions, hydrated potassium ions, sodium ions, and hydrated sodium ions over the electrolytes such as ferric ions, hydrated ferric ions, ferrous ions, and hydrated ferrous ions.

Suitable hydrophilic ionomeric polymers include, but are not limited to, a polyphosphoric acid-complexed polysaccharide polymer, a polyphosphoric acid and metal ion-complexed polysaccharide polymer, a metal ion-complexed polysaccharide polymer, a boric acid-complexed polysaccharide polymer, an alginate polymer such as sodium alginate, potassium alginate, calcium alginate, ammonium alginate, an alginic acid polymer, a hyaluronic acid polymer, a boric acid-complexed polyvinyl alcohol polymer, polyphosphoric acid-complexed polyvinyl alcohol polymer, a polyphosphoric acid and metal ion-complexed polyvinyl alcohol polymer, a metal ion-complexed polyvinyl alcohol polymer, a metal ion-complexed poly(acrylic acid) polymer, a boric acid-complexed poly(acrylic acid) polymer, a metal ion-complexed poly(methacrylic acid), a boric acid-complexed poly(methacrylic acid), or combinations thereof.

Various types of polysaccharide polymers may be used, including, but not limited to, chitosan, sodium alginate, potassium alginate, calcium alginate, ammonium alginate, alginic acid, sodium hyaluronate, potassium hyaluronate, calcium hyaluronate, ammonium hyaluronate, hyaluronic acid, dextran, pullulan, carboxymethyl curdlan, sodium carboxymethyl curdlan, potassium carboxymethyl curdlan, calcium carboxymethyl curdlan, ammonium carboxymethyl curdlan, κ-carrageenan, λ-carrageenan, ι-carrageenan, carboxymethyl cellulose, sodium carboxymethyl cellulose, potassium carboxymethyl cellulose, calcium carboxymethyl cellulose, ammonium carboxymethyl cellulose, pectic acid, chitin, chondroitin, xanthan gum, or combinations thereof.

In some embodiments, the hydrophilic ionomeric polymer is a polyphosphoric acid-complexed chitosan polymer, a polyphosphoric acid and metal ion-complexed chitosan polymer, a metal ion-complexed alginic acid polymer, or combinations thereof.

In some embodiments, the hydrophilic ionomeric polymer is a boric acid-complexed polyvinyl alcohol polymer, a boric acid-complexed alginic acid, or a blend of boric acid-complexed polyvinyl alcohol and alginic acid polymer.

In some embodiments, the metal ion complexing agent is ferric ion, ferrous ion, or vanadium ion.

The microporous support membrane should have good thermal stability (stable up to at least 100° C.), high aqueous and organic solution resistance (insoluble in aqueous and organic solutions) under low pH condition (e.g., pH less than 6), high resistance to oxidizing and reducing conditions (insoluble and no performance drop under oxidizing and reducing conditions), high mechanical strength (no dimensional change under the system operation conditions), as well as other factors dictated by the operating conditions for energy storage applications. The microporous support membrane must be compatible with the cell chemistry and meet the mechanical demands of cell stacking or winding assembly operations. The microporous support membrane has high ionic conductivity, but low selectivity of charge-carrying ions such as protons, hydrated protons, chloride ions, potassium ions, hydrated potassium ions, sodium ions, and hydrated sodium ions over the electrolytes such as ferric ions, hydrated ferric ions, ferrous ions, and hydrated ferrous ions.

The polymers suitable for the preparation of the microporous support membrane can be selected from, but not limited to, polyolefins such as polyethylene and polypropylene, polyamide such as Nylon 6, Nylon 6,6, polyacrylonitrile, polyethersulfone, sulfonated polyethersulfone, polysulfone, sulfonated polysulfone, poly(ether ether ketone), sulfonated poly(ether ether ketone), polyester, cellulose acetate, cellulose triacetate, polybenzimidazole, polyimide, polyvinylidene fluoride, polycarbonate, cellulose, or combinations thereof. These polymers provide a range of properties such as low cost, high stability in water and electrolytes under a wide range of pH, good mechanical stability, and ease of processability for membrane fabrication.

The microporous support membrane can have either a symmetric porous structure or an asymmetric porous structure. The asymmetric microporous support membrane can be formed by a phase inversion membrane fabrication approach followed by direct air drying, or by phase inversion followed by solvent exchange methods. The microporous support membrane also can be fabricated via a dry processing of thermoplastic polyolefins or a wet processing of thermoplastic olefins. The dry processing of thermoplastic polyolefins utilizes extrusion to bring the polymer above its melting point and form it into the desired shape. Subsequent annealing and stretching processes may also be done to increase the crystallinity and orientation and dimension of the micropores. The wet processing of polyolefin separators is done with the aid of a hydrocarbon liquid or low molecular weight oil mixed with the polymer resin or a mixture of the polymer resin and inorganic nanoparticles in the melt phase. The melt mixture is extruded through a die similar to the dry processed separators. The thickness of the microporous support membrane can be in a range of 10-1000 micrometers, or a range of 10-900 micrometers, or a range of 10-800 micrometers, or a range of 10-700 micrometers, or a range of 10-600 micrometers, or a range of 10-500 micrometers, or a range of 20-500 micrometers. The pore size of the microporous membrane can be in a range of 10 nanometers to 50 micrometers, or a range of 50 nanometers to 10 micrometers, or a range of 0.2 micrometers to 1 micrometer.

In one embodiment, the method of making the TFC membrane comprises applying a layer of an aqueous solution comprising a hydrophilic polymer to one surface of a microporous support membrane; drying the coated membrane; and optionally complexing the hydrophilic polymer using a complexing agent to form a cross-linked hydrophilic ionomeric polymer.

In some embodiments, the coated membrane is dried before complexing the hydrophilic ionomeric polymer. In other embodiments, the coated membrane is dried after complexing the hydrophilic polymer. In other embodiments, the coated membrane is dried before complexing the hydrophilic ionomeric polymer and is dried again after complexing the hydrophilic polymer. The coated membrane may be dried for a time in a range of 5 min to 5 h, or 5 min to 4 h, or 5 min to 3 h, or 10 min to 2 h, or 30 min to 1 h at a temperature in a range of 40° C. to 100° C., or 40° C. to 80° C., or 55° C. to 65° C.

In some embodiments, the complexing agent is selected from polyphosphoric acid, boric acid, a metal ion, or combinations thereof.

In some embodiments, the metal ion is ferric ion or ferrous ion.

In some embodiments, the aqueous solution comprises acetic acid or other inorganic or organic acids.

In some embodiments, the hydrophilic ionomeric polymer on the coated membrane is treated in a second aqueous solution of hydrochloric acid before complexing the hydrophilic polymer.

In some embodiments, the hydrophilic polymer layer on the coated membrane is immersed in a second aqueous solution of polyphosphoric acid, boric acid, metal salt, hydrochloric acid, or combinations thereof.

In some embodiments, the hydrophilic polymer layer on the coated membrane is immersed in a second aqueous solution of polyphosphoric acid or boric acid for a time in a range of 5 min to 24 h, or 5 min to 12 h, or 5 min to 8 h, or 10 min to 5 h, or 30 min to 1 h, and then immersed in an aqueous metal salt or hydrochloric acid solution for a time in a range of 5 min to 24 h, or 5 min to 12 h, or 5 min to 8 h, or 10 min to 5 h, or 30 min to 1 h.

In other embodiments, the hydrophilic polymer is complexed in situ with a complexing agent in a negative electrolyte, a positive electrolyte, or both the negative electrolyte and the positive electrolyte in a redox flow battery cell.

In some embodiments, the hydrophilic ionomeric polymer comprises a polysaccharide polymer, a poly(acrylic acid) polymer, a poly(methacrylic acid), or combinations thereof.

In some embodiments, the polysaccharide polymer comprises chitosan, sodium alginate, potassium alginate, calcium alginate, ammonium alginate, alginic acid, sodium hyaluronate, potassium hyaluronate, calcium hyaluronate, ammonium hyaluronate, hyaluronic acid, dextran, pullulan, carboxymethyl curdlan, sodium carboxymethyl curdlan, potassium carboxymethyl curdlan, calcium carboxymethyl curdlan, ammonium carboxymethyl curdlan, κ-carrageenan, λ-carrageenan, ι-carrageenan, carboxymethyl cellulose, sodium carboxymethyl cellulose, potassium carboxymethyl cellulose, calcium carboxymethyl cellulose, ammonium carboxymethyl cellulose, pectic acid, chitin, chondroitin, xanthan gum, or combinations thereof.

In one embodiment, the redox flow battery system comprises: at least one rechargeable cell comprising a positive electrolyte, a negative electrolyte, and an ionically conductive thin film composite (TFC) membrane positioned between the positive electrolyte and the negative electrolyte, the positive electrolyte in contact with a positive electrode, and the negative electrolyte in contact with a negative electrode; the TFC membrane comprising a microporous support membrane and a hydrophilic ionomeric polymer coating layer on a surface of the microporous support membrane, wherein the hydrophilic ionomeric polymer coating layer is ionically conductive; the positive electrolyte consisting essentially of $FeCl_2$ at a concentration of 1.0-4.5 M, KCl at a concentration of 1.0-3.5 M, HCl at a concentration of 0.05-2.5 M, and glycine at a concentration of 0.01-3.0 M, optionally boric acid at a concentration of 0.01-1.0 M, and optionally $FeCl_3$ at a concentration of 0.1-1.0 M; and the negative electrolyte consisting essentially of $FeCl_2$ at a concentration of 1.0-4.5 M, KCl at a concentration of 1.0-3.5 M, and boric acid at a concentration of 0.01-1.0 M, optionally glycine at a concentration of 0.01-3.0 M, and optionally $FeCl_3$ at a concentration of 0.1-1.0 M.

In another embodiment, the redox flow battery system comprises: at least one rechargeable cell comprising a positive electrolyte, a negative electrolyte, and an ionically conductive thin film composite (TFC) membrane positioned between the positive electrolyte and the negative electrolyte, the positive electrolyte in contact with a positive electrode, and the negative electrolyte in contact with a negative electrode; the TFC membrane comprising a microporous support membrane and a hydrophilic ionomeric polymer coating layer on a surface of the microporous support membrane, wherein the hydrophilic ionomeric polymer coating layer is ionically conductive; the positive electrolyte consisting essentially of $FeCl_2$ at a concentration of 1.0-4.5 M, $NH_4Cl$ at a concentration of 1.0-4.0 M, HCl at a concentration of 0.05-2.5 M, and glycine at a concentration of 0.01-3.0 M, optionally boric acid at a concentration of 0.01-1.0 M, and optionally $FeCl_3$ at a concentration of 0.1-1.0 M; and the negative electrolyte consisting essentially of $FeCl_2$ at a concentration of 1.0-4.5 M, $NH_4Cl$ at a concentration of 1.0-4.0 M, and boric acid at a concentration of 0.01-1.0 M, optionally glycine at a concentration of 0.01-3.0 M, and optionally $FeCl_3$ at a concentration of 0.1-1.0 M.

EXAMPLES

Comparative Example 1: An Electrolyte Formula with Glycine in the Positive Electrolyte Solution, and No Glycine and No Boric Acid in the Negative Electrolyte Solution (Abbreviated as 0.2M-G(+))

An electrolyte formula with glycine in the positive electrolyte solution, and no glycine or boric acid in the negative electrolyte solution (abbreviated as 0.2M-G(+)) was prepared. The positive electrolyte solution was prepared by dissolving 1.5 M $FeCl_2$, 2.0 M KCl, 0.2 M glycine, and 0.4 M HCl in ultrapure water (18.2 MΩ·cm), and the pH of the solution was −0.3. The negative solution was prepared by dissolving 1.5 M $FeCl_2$ and 2.0 M KCl in ultrapure water (18.2 MΩ·cm), and the pH of the solution was 1.75. The all-iron redox flow battery performance of the 0.2M-G(+) electrolyte formula was evaluated using a boric acid complexed alginic acid/Daramic® thin-film composite (TFC) membrane (abbreviated as BA-AA/Daramic®) as disclosed in Example 5 of U.S. Provisional Application 63/109,683, filed Nov. 4, 2020, entitled Ionically Conductive Thin Film Composite Membranes for Energy Storage Applications (without in-situ boric acid complexation) and an electrochemical impedance spectroscopy (EIS) with a BCS-810 battery cycling system (Biologic, FRANCE) at room temperature under the testing conditions of charge current density of 30 mA/$cm^2$, charge time of 4 h, discharge current density of 30 mA/$cm^2$, and discharge time of 4 h. The coulombic efficiency (CE), voltage efficiency (VE), and energy efficiency (EE) of the battery system were shown in Table 1.

Comparative Example 2: An Electrolyte Formula with Boric Acid in the Negative Electrolyte Solution, and No Glycine and No Boric Acid in the Positive Electrolyte Solution (Abbreviated as 0.2M-B(−))

An electrolyte formula with boric acid in the negative electrolyte solution and no glycine and boric acid in the positive electrolyte solution (abbreviated as 0.2M-B(−)) was prepared. The positive electrolyte solution was prepared by dissolving 1.5 M $FeCl_2$, 2.0 M KCl, and 0.4 M HCl in ultrapure water (18.2 MΩ·cm), and the pH of the solution was −0.4. The negative solution was prepared by dissolving 1.5 M $FeCl_2$, 2.0 M KCl, and 0.2 M boric acid in ultrapure water (18.2 MΩ·cm), and the pH of the solution was 1.7. The all-iron redox flow battery performance of the 0.2M-B(−) electrolyte formula was evaluated using a boric acid complexed alginic acid/Daramic® thin-film composite (TFC) membrane (abbreviated as BA-AA/Daramic®) as disclosed in Example 5 of U.S. Provisional Application 63/109,683, filed Nov. 4, 2020, entitled Ionically Conductive Thin Film Composite Membranes for Energy Storage Applications and an electrochemical impedance spectroscopy (EIS) with a BCS-810 battery cycling system (Biologic, FRANCE) at room temperature under the testing conditions of charge current density of 30 mA/$cm^2$, charge time of 4 h, discharge current density of 30 mA/$cm^2$, discharge time of 4 h. The voltage efficiency (VE), coulombic efficiency (CE), and energy efficiency (EE) of the battery system are shown in Table 1.

Comparative Example 3: An Electrolyte Formula with Boric Acid in Both the Negative Electrolyte Solution and the Positive Electrolyte Solutions (Abbreviated as 0.2M-B(−)-0.1M-B(+))

An electrolyte formula with boric acid in both the negative electrolyte solution and the positive electrolyte solutions (abbreviated as 0.2M-B(−)-0.1M-B(+)) was prepared. The 0.2M-B(−)-0.1M-B(+) formula comprises a positive electrolyte solution with boric acid and a negative electrolyte solution with boric acid. The positive electrolyte solution was prepared by dissolving 1.5 M $FeCl_2$, 2.0 M KCl, 0.4 M HCl, and 0.1 M boric acid in ultrapure water (18.2 MΩ·cm) and the pH of the solution is −0.45. The negative solution was prepared by dissolving 1.5 M $FeCl_2$, 2.0 M KCl, and 0.2 M boric acid in ultrapure water (18.2 MΩ·cm) and the pH of the solution is 1.7. The all-iron redox flow battery performance of the 0.2M-B(−)-0.1M-B(+) electrolyte formula was evaluated using a boric acid complexed alginic acid/Daramic® thin-film composite (TFC) membrane (abbreviated as BA-AA/Daramic®) as disclosed in Example 5 in U.S. Provisional Application 63/109,683, filed Nov. 4, 2020, entitled Ionically Conductive Thin Film Composite Membranes for Energy Storage Applications and an electrochemical impedance spectroscopy (EIS) with a BCS-810 battery cycling system (Biologic, FRANCE) at room temperature under the testing conditions of charge current density of 30 mA/cm$^2$, charge time of 4 h, discharge current density of 30 mA/cm$^2$, discharge time of 4 h. The voltage efficiency (VE), coulombic efficiency (CE), and energy efficiency (EE) of the battery system are shown in Table 1.

Comparative Example 4: An Electrolyte Formula with Both L-Ascorbic Acid and Boric Acid in the Positive Electrolyte Solution and with Boric Acid in the Negative Electrolyte Solution (Abbreviated as 0.3M-AA-0.1M-B(+)-0.2M-B(−))

An electrolyte formula with both L-ascorbic acid and boric acid in the positive electrolyte solution and boric acid in the negative electrolyte solution (abbreviated as 0.3M-AA-0.1M-B(+)-0.2M-B(−)) was prepared. The positive electrolyte solution was prepared by dissolving 1.5 M FeCl$_2$, 2.0 M KCl, 0.4 M HCl, 0.3 M L-ascorbic acid, 0.6 M KOH, and 0.1 M boric acid in ultrapure water (18.2 MΩ·cm), and the pH of the solution was 1.12. The negative solution was prepared by dissolving 1.5 M FeCl$_2$, 2.0 M KCl, and 0.2 M boric acid in ultrapure water (18.2 MΩ·cm), and the pH of the solution was 1.7. The all-iron redox flow battery performance of the 0.3M-AA-0.1M-B(+)-0.2M-B(−) electrolyte formula was evaluated using a boric acid complexed alginic acid/Daramic® thin-film composite (TFC) membrane (abbreviated as BA-AA/Daramic®) as disclosed in Example 5 in U.S. Provisional Application 63/109,683, filed Nov. 4, 2020, entitled Ionically Conductive Thin Film Composite Membranes for Energy Storage Applications and an electrochemical impedance spectroscopy (EIS) with a BCS-810 battery cycling system (Biologic, FRANCE) at room temperature under the testing conditions of charge current density of 30 mA/cm$^2$, charge time of 4 h, discharge current density of 30 mA/cm$^2$, discharge time of 4 h. The voltage efficiency (VE), coulombic efficiency (CE), and energy efficiency (EE) of the battery system are shown in Table 1.

Example 1: An Electrolyte Formula with Glycine in the Positive Electrolyte Solution and Boric Acid in the Negative Solution (Abbreviated as 0.4M-G(+)-0.2M-B(−))

An electrolyte formula with glycine in the positive electrolyte solution and boric acid in the negative solution (abbreviated as 0.4M-G(+)-0.2M-B(−)) was prepared. The 0.4M-G(+)-0.2M-B(−) formula comprises a positive electrolyte solution with glycine and a negative electrolyte solution with boric acid. The positive electrolyte solution was prepared by dissolving 1.5 M FeCl$_2$, 2.0 M KCl, 0.4 M HCl, and 0.4 M glycine in ultrapure water (18.2 MΩ·cm) and the pH of the solution is 0.8. The negative solution was prepared by dissolving 1.5 M FeCl$_2$, 2.0 M KCl, and 0.2 M boric acid in ultrapure water (18.2 MΩ·cm) and the pH of the solution is 1.7. The all-iron redox flow battery performance of the 0.4M-G(+)-0.2M-B(−) electrolyte formula was evaluated using a boric acid complexed alginic acid/Daramic® thin-film composite (TFC) membrane (abbreviated as BA-AA/Daramic®) as disclosed in Example 5 in U.S. Provisional Application 63/109,683, filed Nov. 4, 2020, entitled Ionically Conductive Thin Film Composite Membranes for Energy Storage Applications and an electrochemical impedance spectroscopy (EIS) with a BCS-810 battery cycling system (Biologic, FRANCE) at room temperature under the testing conditions of charge current density of 30 mA/cm$^2$, charge time of 4 h, discharge current density of 30 mA/cm$^2$, discharge time of 4 h. The voltage efficiency (VE), coulombic efficiency (CE), and energy efficiency (EE) of the battery system are shown in Table 1.

Example 2: An Electrolyte Formula with Glycine and Boric Acid in Both the Positive Electrolyte Solution and the Negative Solution (Abbreviated as 0.4M-G-0.1M-B(+)-0.2M-G-0.2M-B(−))

An electrolyte formula with glycine and boric acid in both the positive electrolyte solution and the negative solution (abbreviated as 0.4M-G-0.1M-B(+)-0.2M-G-0.2M-B(−)) was prepared. The positive electrolyte solution was prepared by dissolving 1.5 M FeCl$_2$, 2.0 M KCl, 0.4 M HCl, 0.1 M boric acid, and 0.4 M glycine in ultrapure water (18.2 MΩ·cm), and the pH of the solution was 0.7. The negative solution was prepared by dissolving 1.5 M FeCl$_2$, 2.0 M KCl, 0.2 M boric acid, and 0.2 M glycine in ultrapure water (18.2 MΩ·cm), and the pH of the solution was 1.6. The all-iron redox flow battery performance of the 0.4M-G-0.1M-B(+)-0.2M-G-0.2M-B(−) electrolyte formula was evaluated using a boric acid complexed alginic acid/Daramic® thin-film composite (TFC) membrane (abbreviated as BA-AA/Daramic®) as disclosed in Example 5 of U.S. Provisional Application 63/109,683, filed Nov. 4, 2020, entitled Ionically Conductive Thin Film Composite Membranes for Energy Storage Applications and an electrochemical impedance spectroscopy (EIS) with a BCS-810 battery cycling system (Biologic, FRANCE) at room temperature under the testing conditions of charge current density of 30 mA/cm$^2$, charge time of 4 h, discharge current density of 30 mA/cm$^2$, discharge time of 4 h. The voltage efficiency (VE), coulombic efficiency (CE), and energy efficiency (EE) of the battery system are shown in Table 1.

Example 3: An Electrolyte Formula with Glycine and Boric Acid in Both the Positive Electrolyte Solution and the Negative Solution (Abbreviated as 0.2M-G-0.1M-B(+)-0.2M-G-0.1M-B(−))

An electrolyte formula with glycine and boric acid in both the positive electrolyte solution and the negative solution (abbreviated as 0.2M-G-0.1M-B(+)-0.2M-G-0.1M-B(−)) was prepared. The positive electrolyte solution was prepared by dissolving 1.5 M FeCl$_2$, 2.0 M KCl, 0.2 M HCl, 0.1 M boric acid, and 0.2 M glycine in ultrapure water (18.2 MΩ·cm), and the pH of the solution was 0.7. The negative solution was prepared by dissolving 1.5 M FeCl$_2$, 2.0 M KCl, 0.1 M boric acid, and 0.2 M glycine in ultrapure water (18.2 MΩ·cm), and the pH of the solution was 1.7. The all-iron redox flow battery performance of the 0.2M-G-0.1M-B(+)-0.2M-G-0.1M-B(−) electrolyte formula was evaluated using a boric acid complexed alginic acid/Daramic® thin-film composite (TFC) membrane (abbreviated as BA-AA/Daramic®) as disclosed in Example 5 of U.S. Provisional Application 63/109,683, filed Nov. 4, 2020, entitled Ionically Conductive Thin Film Composite Membranes for Energy Storage Applications and an electrochemical impedance spectroscopy (EIS) with a BCS-810 battery cycling system (Biologic, FRANCE) at room temperature under the testing conditions of charge current density of 30 mA/cm², charge time of 4 h, discharge current density of 30 mA/cm², discharge time of 4 h. The voltage efficiency (VE), coulombic efficiency (CE), and energy efficiency (EE) of the battery system are shown in Table 1.

Example 4: An Electrolyte Formula with Glycine and Boric Acid as Both the Positive Electrolyte Solution and the Negative Solution (Abbreviated as 0.2M-G-0.1M-B(+, −))

An electrolyte formula with glycine and boric acid as both the positive electrolyte solution and the negative solution (abbreviated as 0.2M-G-0.1M-B(+, −)) was prepared. The electrolyte solution was prepared by dissolving 1.5 M $FeCl_2$, 3.5 M $NH_4Cl$, 0.2 M HCl, 0.1 M boric acid, and 0.2 M glycine in ultrapure water (18.2 MΩ·cm), and the pH of the solution was adjusted to 1.5. The all-iron redox flow battery performance of the 0.2M-G-0.1M-B(+, −) electrolyte formula was evaluated using a boric acid complexed alginic acid/Daramic® thin-film composite (TFC) membrane (abbreviated as BA-AA/Daramic®) as disclosed in Example 5 of U.S. Provisional Application 63/109,683, filed Nov. 4, 2020, entitled Ionically Conductive Thin Film Composite Membranes for Energy Storage Applications and an electrochemical impedance spectroscopy (EIS) with a BCS-810 battery cycling system (Biologic, FRANCE) at room temperature under the testing conditions of charge current density of 30 mA/cm², charge time of 4 h, discharge current density of 30 mA/cm², discharge time of 4 h.

Example 5: An Electrolyte Formula with Glycine and Boric Acid in the Positive Electrolyte Solution and with Boric Acid in the Negative Solution (Abbreviated as 0.4M-G-0.1M-B(+)-0.2M-B(−))

An electrolyte formula with glycine and boric acid in the positive electrolyte solution and with boric acid in the negative solution (abbreviated as 0.4M-G-0.1M-B(+)-0.2M-B(−)) was prepared. The positive electrolyte solution was prepared by dissolving 1.5 M $FeCl_2$, 2.0 M KCl, 0.4 M HCl, 0.1 M boric acid, and 0.4 M glycine in ultrapure water (18.2 MΩ·cm), and the pH of the solution was 0.7. The negative solution was prepared by dissolving 1.5 M $FeCl_2$, 2.0 M KCl, and 0.2 M boric acid in ultrapure water (18.2 MΩ·cm), and the pH of the solution was 1.7. The all-iron redox flow battery performance of the 0.4M-G-0.1M-B(+)-0.2M-B(−) electrolyte formula was evaluated using a boric acid complexed alginic acid/Daramic® thin-film composite (TFC) membrane (abbreviated as BA-AA/Daramic®) as disclosed in Example 5 of U.S. Provisional Application 63/109,683, filed Nov. 4, 2020, entitled Ionically Conductive Thin Film Composite Membranes for Energy Storage Applications and an electrochemical impedance spectroscopy (EIS) with a BCS-810 battery cycling system (Biologic, FRANCE) at room temperature under the testing conditions of charge current density of 30 mA/cm², charge time of 4 h, discharge current density of 30 mA/cm², discharge time of 4 h. The voltage efficiency (VE), coulombic efficiency (CE), and energy efficiency (EE) of the battery system were shown in Table 1.

Example 6: An Electrolyte Formula Using $NH_4Cl$ as the Supporting Electrolyte and with Glycine and Boric Acid in the Positive Electrolyte Solution and with Boric Acid in the Negative Solution (Abbreviated as 0.4M-G-0.1M-B(+)-0.2M-B(−)-$NH_4Cl$)

An electrolyte formula using $NH_4Cl$ as the supporting electrolyte and with glycine and boric acid in the positive electrolyte solution and with boric acid in the negative solution (abbreviated as 0.2M-G-0.1M-B(+)-0.2M-B(−)-$NH_4Cl$) was prepared. The positive electrolyte solution was prepared by dissolving 1.5 M $FeCl_2$, 3.5 M $NH_4Cl$, 0.4 M HCl, 0.1 M boric acid, and 0.4 M glycine in ultrapure water (18.2 MΩ·cm), and the pH of the solution was 0.4. The negative solution was prepared by dissolving 1.5 M $FeCl_2$, 3.5 M $NH_4Cl$, and 0.2 M boric acid in ultrapure water (18.2 MΩ·cm), and the pH of the solution was 1.8. The all-iron redox flow battery performance of the 0.4M-G-0.1M-B(+)-0.2M-B(−)-$NH_4Cl$ electrolyte formula was evaluated using a boric acid complexed alginic acid/Daramic® thin-film composite (TFC) membrane (abbreviated as BA-AA/Daramic®) as disclosed in Example 5 of U.S. Provisional Application 63/109,683, filed Nov. 4, 2020, entitled Ionically Conductive Thin Film Composite Membranes for Energy Storage Applications and an electrochemical impedance spectroscopy (EIS) with a BCS-810 battery cycling system (Biologic, FRANCE) at 40° C. under the testing conditions of charge current density of 30 mA/cm², charge time of 4 h, discharge current density of 30 mA/cm², discharge time of 4 h. The voltage efficiency (VE), coulombic efficiency (CE), and energy efficiency (EE) of the battery system were shown in Table 1.

Example 7: All-Iron Redox Flow Battery Performance Study on Various Electrolyte Formulas The number of battery charge/discharge cycles, VE, CE, and EE of the all-iron redox flow batteries comprising the electrolyte solutions as described in Examples 1-5 and comparative examples 1-3 and boric acid complexed alginic acid/Daramic® thin-film composite (TFC) membrane were measured using EIS with a BCS-810 battery cycling system (Biologic, FRANCE), and the results are shown in Table 1. It can be seen from Table 1 that the all-iron redox flow battery cells comprising the new electrolyte formulas as described in Examples 1-5 comprising glycine in the positive electrolyte and boric acid in the negative electrolyte (Example 1), both glycine and boric acid in the positive electrolyte and boric acid in the negative electrolyte (Examples 4 and 5), or both glycine and boric acid in the positive electrolyte and the negative electrolyte (Examples 2 and 3) showed longer battery cycles, higher VE, CE, and EE than those cells without boric acid in the negative electrolyte solution (Comparative Example 2), or without glycine in the positive electrolytes (Comparative Example 2 and 3). It can also be seen from Table 1 that the all-iron redox flow battery cells comprising the new electrolyte formulas as described in Example 4 showed comparable VE, longer battery cycles, higher CE, and higher EE than the cell with L-ascorbic acid in the positive electrolyte solution and with boric acid in the negative electrolyte solution (Comparative Example 4). These results demonstrate that an electrolyte formula comprising at least glycine as an electrolyte additive in the positive electrolyte solution and at least boric acid as an electrolyte additive in the negative electrolyte solution can provide significantly improved all-iron redox flow battery performance compared to an electrolyte formula without boric acid in the negative electrolyte solution or without glycine in the positive electrolyte solution, or with L-ascorbic acid in the positive solution and boric acid in the negative solution. Incorporating glycine into the positive electrolyte solution and boric acid into the negative solution achieved advanced battery performance. Furthermore, the incorporation of both glycine and boric acid electrolyte additives into the positive electrolyte solution and the incorporation of boric acid or both boric acid and glycine into the negative electrolyte solution further improved the battery performance compared to the electrolyte formula with only glycine in the positive electrolyte solution and only boric acid in the negative electrolyte solution.

TABLE 1

All-iron redox flow battery performance of various electrolyte formulas [a]

| Electrolyte formula | # Cycles | VE (%) | CE (%) | EE (%) |
|---|---|---|---|---|
| Comparative Ex. 1: 0.2M-G(+) | 7 | 60.8 | 78.9 | 48.0 |
| Comparative Ex. 2: 0.2M-B(−) | 23 | 62.7 | 87.8 | 55.1 |
| Comparative Ex. 3: 0.2M-B(−)-0.1M-B(+) | 28 | 60.3 | 89.2 | 53.8 |
| Comparative Ex. 4: 0.3M-AA-0.1M-B(+)-0.2M-B(−) | 30 | 66.9 | 88.0 | 58.9 |
| Ex. 1: 0.4M-G(+)-0.2M-B(−) | 31 | 66.6 | 89.7 | 59.7 |
| Ex. 2: 0.4M-G-0.1M-B(+)-0.2M-G-0.2M-B(−) | 36 | 66.8 | 93.0 | 62.1 |
| Ex. 3: 0.2M-G-0.1M-B(+)-0.2M-G-0.1M-B(−) | 35 | 65.9 | 92.6 | 61.0 |
| Ex. 4: 0.4M-G-0.1M-B(+)-0.2M-B(−) | 37 | 66.5 | 94.7 | 63.0 |
| Ex. 5: 0.2M-G-0.1M-B(+)-0.2M-B(−)-NH$_4$Cl | 40 | 81.1 | 92.4 | 74.9 |

[a] Charge current density: 30 mA/cm$^2$; charge time: 4 h; discharge current density: 30 mA/cm$^2$; discharge time: 4 h; # of cycles were counted with ≥70% CE.

SPECIFIC EMBODIMENTS

While the following is described in conjunction with specific embodiments, it will be understood that this description is intended to illustrate and not limit the scope of the preceding description and the appended claims.

A first embodiment of the invention is a redox flow battery system, comprising at least one rechargeable cell comprising a positive electrolyte, a negative electrolyte, and an ionically conductive membrane positioned between the positive electrolyte and the negative electrolyte, the positive electrolyte in contact with a positive electrode, and the negative electrolyte in contact with a negative electrode; the positive electrolyte consisting essentially of water, a first amino acid, an inorganic acid, an iron precursor, a supporting electrolyte, and optionally a boric acid; and the negative electrolyte consisting essentially of water, the iron precursor, the supporting electrolyte, and a negative electrolyte additive; wherein the iron precursor is FeCl$_2$, FeCl$_3$, FeSO$_4$, Fe$_2$(SO$_4$)$_3$, FeO, Fe, Fe$_2$O$_3$, or combinations thereof; wherein the supporting electrolyte is LiCl, NaCl, Na$_2$SO$_4$, KCl, NH$_4$Cl, or combinations thereof; and wherein the negative electrolyte additive is boric acid and optionally a second amino acid. An embodiment of the invention is one, any or all of prior embodiments in this paragraph up through the first embodiment in this paragraph wherein the ionically conductive membrane comprises an ionically conductive thin film composite membrane comprising a microporous support membrane and a hydrophilic ionomeric polymer coating layer on a surface of the microporous support membrane, wherein the hydrophilic ionomeric polymer coating layer is ionically conductive. An embodiment of the invention is one, any or all of prior embodiments in this paragraph up through the first embodiment in this paragraph wherein the ionically conductive membrane is made from a perfluorinated ionomer, a partially fluorinated polymer, a non-fluorinated hydrocarbon polymer, a non-fluorinated polymer with an aromatic backbone, or an acid-base blend. An embodiment of the invention is one, any or all of prior embodiments in this paragraph up through the first embodiment in this paragraph wherein the boric acid is present in the positive and negative electrolytes. An embodiment of the invention is one, any or all of prior embodiments in this paragraph up through the first embodiment in this paragraph wherein the first amino acid in the positive electrolyte is glycine. An embodiment of the invention is one, any or all of prior embodiments in this paragraph up through the first embodiment in this paragraph wherein the first amino acid in the positive electrolyte is glycine and the negative electrolyte additive is a combination of boric acid and a second amino acid, and wherein the second amino acid is glycine. An embodiment of the invention is one, any or all of prior embodiments in this paragraph up through the first embodiment in this paragraph wherein the inorganic acid in the positive electrolyte is HCl, H$_2$SO$_4$, or combinations thereof. An embodiment of the invention is one, any or all of prior embodiments in this paragraph up through the first embodiment in this paragraph wherein the positive electrolyte consisting essentially of FeCl$_2$ at a concentration of 1.0-4.5 M, KCl at a concentration of 1.0-3.5 M or NH$_4$Cl at a concentration of 1.0-4.0 M, HCl at a concentration of 0.05-2.5M, and glycine at a concentration of 0.01-3.0 M, optionally boric acid at a concentration of 0.01-1.0 M, and optionally the FeCl$_3$ at a concentration of 0.1-1.0 M. An embodiment of the invention is one, any or all of prior embodiments in this paragraph up through the first embodiment in this paragraph wherein the negative electrolyte consisting essentially of FeCl$_2$ at a concentration of 1.0-4.5 M, KCl at a concentration of 1.0-3.5 M or NH$_4$Cl at a concentration of 1.0-4.0 M, and the boric acid at a concentration of 0.01-1.0 M, optionally glycine at a concentration of 0.01-3.0 M, and optionally the FeCl$_3$ at a concentration of 0.1-1.0 M. An embodiment of the invention is one, any or all of prior embodiments in this paragraph up through the first embodiment in this paragraph wherein a pH of the positive electrolyte is in a range of −1 to 3 and a pH of the negative electrolyte is in a range of 0 to 5. An embodiment of the invention is one, any or all of prior embodiments in this paragraph up through the first embodiment in this paragraph wherein a pH of the positive electrolyte is in a range of 0 to 2 and a pH of the negative electrolyte is in a range of 1 to 4.5. An embodiment of the invention is one, any or all of prior embodiments in this paragraph up through the first embodiment in this paragraph wherein the hydrophilic ionomeric polymer comprises a polyphosphoric acid-complexed polysaccharide polymer, a polyphosphoric acid and metal ion-complexed polysaccharide polymer, a metal ion-complexed polysaccharide polymer, a boric acid-complexed polysaccharide polymer, an alginate polymer such as sodium alginate, potassium alginate, calcium alginate, ammonium alginate, an alginic acid polymer, a hyaluronic acid polymer, a boric acid-complexed polyvinyl alcohol polymer, polyphosphoric acid-complexed polyvinyl alcohol polymer, a polyphosphoric acid and metal ion-complexed polyvinyl alcohol polymer, a metal ion-complexed polyvinyl alcohol polymer, a metal ion-complexed poly(acrylic acid) polymer, a boric acid-complexed poly(acrylic acid) polymer, a metal ion-complexed poly(methacrylic acid), a boric acid-complexed poly(methacrylic acid), or combinations thereof. An embodiment of the invention is one, any or all of prior embodiments in this paragraph up through the first embodiment in this paragraph wherein the polysaccharide polymer comprises chitosan, sodium alginate, potassium alginate, calcium alginate, ammonium alginate, alginic acid, sodium hyaluronate, potassium hyaluronate, calcium hyaluronate, ammonium hyaluronate, hyaluronic acid, dextran, pullulan, carboxymethyl curdlan, sodium carboxymethyl curdlan, potassium carboxymethyl curdlan, calcium carboxymethyl curdlan, ammonium carboxymethyl curdlan, κ-carrageenan, λ-carrageenan, ι-carrageenan, carboxymethyl cellulose, sodium carboxymethyl cellulose, potassium carboxymethyl cellulose, calcium carboxymethyl cellulose, ammonium carboxymethyl cellulose, pectic acid, chitin, chondroitin, xanthan gum, or combinations thereof. An embodiment of the invention is one, any or all of prior embodiments in this paragraph up through the first embodiment in this paragraph wherein metal ion is ferric ion or ferrous ion. An embodiment of the invention is one, any or all of prior embodiments in this paragraph up through the first embodiment in this paragraph wherein the hydrophilic ionomeric polymer is a polyphosphoric acid-complexed chitosan polymer, a polyphosphoric acid and metal ion-complexed chitosan polymer, a metal ion-complexed alginic acid polymer, or combinations thereof, where in the metal ion is ferric ion or ferrous ion. An embodiment of the invention is one, any or all of prior embodiments in this paragraph up through the first embodiment in this paragraph wherein the hydrophilic ionomeric polymer is a boric acid-complexed polyvinyl alcohol polymer, a boric acid-complexed alginic acid, or a blend of boric acid-complexed polyvinyl alcohol and alginic acid polymer. An embodiment of the invention is one, any or all of prior embodiments in this paragraph up through the first embodiment in this paragraph wherein the support membrane comprises polyethylene, polypropylene, polyamide, polyacrylonitrile, polyethersulfone, sulfonated polyethersulfone, polysulfone, sulfonated polysulfone, poly(ether ether ketone), sulfonated poly(ether ether ketone), polyester, polyvinylidene fluoride, carbon, polycarbonate, cellulose, acrylic, phenolic, cellulose acetate, cellulose triacetate, polyimide, polybenzimidazole, or combinations thereof. An embodiment of the invention is one, any or all of prior embodiments in this paragraph up through the first embodiment in this paragraph wherein the hydrophilic ionomeric polymer is present in the micropores of the support membrane.

A second embodiment of the invention is a redox flow battery system comprising at least one rechargeable cell comprising a positive electrolyte, a negative electrolyte, and an ionically conductive thin film composite (TFC) membrane positioned between the positive electrolyte and the negative electrolyte, the positive electrolyte in contact with a positive electrode, and the negative electrolyte in contact with a negative electrode; the TFC membrane comprising a microporous support membrane and a hydrophilic ionomeric polymer coating layer on a surface of the microporous support membrane, wherein the hydrophilic ionomeric polymer coating layer is ionically conductive; the positive electrolyte consisting essentially of $FeCl_2$ at a concentration of 1.0-4.5 M, KCl at a concentration of 1.0-3.5 M, HCl at a concentration of 0.05-2.5 M, and glycine at a concentration of 0.01-3.0 M, optionally boric acid at a concentration of 0.01-1.0 M, and optionally $FeCl_3$ at a concentration of 0.1-1.0 M; and the negative electrolyte consisting essentially of $FeCl_2$ at a concentration of 1.0-4.5 M, KCl at a concentration of 1.0-3.5 M, and boric acid at a concentration of 0.01-1.0 M, optionally glycine at a concentration of 0.01-3.0 M, and optionally $FeCl_3$ at a concentration of 0.1-1.0 M.

A third embodiment of the invention is a redox flow battery system comprising at least one rechargeable cell comprising a positive electrolyte, a negative electrolyte, and an ionically conductive thin film composite (TFC) membrane positioned between the positive electrolyte and the negative electrolyte, the positive electrolyte in contact with a positive electrode, and the negative electrolyte in contact with a negative electrode; the TFC membrane comprising a microporous support membrane and a hydrophilic ionomeric polymer coating layer on a surface of the microporous support membrane, wherein the hydrophilic ionomeric polymer coating layer is ionically conductive; the positive electrolyte consisting essentially of $FeCl_2$ at a concentration of 1.0-4.5 M, $NH_4Cl$ at a concentration of 1.0-4.0 M, HCl at a concentration of 0.05-2.5 M, and glycine at a concentration of 0.01-3.0 M, optionally boric acid at a concentration of 0.01-1.0 M, and optionally $FeCl_3$ at a concentration of 0.1-1.0 M; and the negative electrolyte consisting essentially of $FeCl_2$ at a concentration of 1.0-4.5 M, $NH_4Cl$ at a concentration of 1.0-4.0 M, and boric acid at a concentration of 0.01-1.0 M, optionally glycine at a concentration of 0.01-3.0 M, and optionally $FeCl_3$ at a concentration of 0.1-1.0 M.

Without further elaboration, it is believed that using the preceding description that one skilled in the art can utilize the present invention to its fullest extent and easily ascertain the essential characteristics of this invention, without departing from the spirit and scope thereof, to make various changes and modifications of the invention and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims.

In the foregoing, all temperatures are set forth in degrees Celsius and, all parts and percentages are by weight, unless otherwise indicated.

What is claimed is:

1. A redox flow battery system, comprising:
    at least one rechargeable cell comprising a positive electrolyte, a negative electrolyte, and an ionically conductive membrane positioned between the positive electrolyte and the negative electrolyte, the positive electrolyte in contact with a positive electrode, and the negative electrolyte in contact with a negative electrode;
    the positive electrolyte consisting essentially of water, a first amino acid, an inorganic acid, an iron precursor, a supporting electrolyte, and optionally a boric acid; and
    the negative electrolyte consisting essentially of water, the iron precursor, the supporting electrolyte, and a negative electrolyte additive;
    wherein the iron precursor is $FeCl_2$, $FeCl_3$, $FeSO_4$, $Fe_2(SO_4)_3$, FeO, Fe, $Fe_2O_3$, or combinations thereof;
    wherein the supporting electrolyte is LiCl, NaCl, $Na_2SO_4$, KCl, $NH_4Cl$, or combinations thereof; and
    wherein the negative electrolyte additive is boric acid and optionally a second amino acid;
    wherein the ionically conductive membrane comprises an ionically conductive thin film composite membrane comprising a microporous support membrane and a hydrophilic ionomeric polymer coating layer on a surface of the microporous support membrane, wherein the hydrophilic ionomeric polymer coating layer is ionically conductive; and
    wherein the hydrophilic ionomeric polymer comprises a polyphosphoric acid-complexed polysaccharide polymer, a polyphosphoric acid and metal ion-complexed polysaccharide polymer, a metal ion-complexed polysaccharide polymer, a boric acid-complexed polysaccharide polymer, an alginate polymer, an alginic acid polymer, a hyaluronic acid polymer, a boric acid-complexed polyvinyl alcohol polymer, polyphosphoric acid-complexed polyvinyl alcohol polymer, a polyphosphoric acid and metal ion-complexed polyvinyl alcohol polymer, a metal ion-complexed polyvinyl alcohol polymer, a metal ion-complexed poly(acrylic acid) polymer, a boric acid-complexed poly(acrylic acid) polymer, a metal ion-complexed poly(methacrylic acid), a boric acid-complexed poly(methacrylic acid), or combinations thereof; and wherein metal ion is ferric ion or ferrous ion.

2. The battery system of claim 1 wherein the ionically conductive membrane is made from a perfluorinated ionomer, a partially fluorinated polymer, a non-fluorinated hydrocarbon polymer, a non-fluorinated polymer with an aromatic backbone, or an acid-base blend.

3. The battery system of claim 1 wherein the boric acid is present in the positive and negative electrolytes.

4. The battery system of claim 1 wherein the first amino acid in the positive electrolyte is glycine.

5. The battery system of claim 1 wherein the first amino acid in the positive electrolyte is glycine and the negative electrolyte additive is a combination of boric acid and a second amino acid, and wherein the second amino acid is glycine.

6. The battery system of claim 1 wherein the inorganic acid in the positive electrolyte is HCl, $H_2SO_4$, or combinations thereof.

7. The battery system of claim 1 wherein the positive electrolyte consisting essentially of $FeCl_2$ at a concentration of 1.0-4.5 M, KCl at a concentration of 1.0-3.5 M or $NH_4Cl$ at a concentration of 1.0-4.0 M, HCl at a concentration of 0.05-2.5M, and glycine at a concentration of 0.01-3.0 M, optionally boric acid at a concentration of 0.01-1.0 M, and optionally the $FeCl_3$ at a concentration of 0.1-1.0 M.

8. The battery system of claim 1 wherein the negative electrolyte consisting essentially of $FeCl_2$ at a concentration of 1.0-4.5 M, KCl at a concentration of 1.0-3.5 M or $NH_4Cl$ at a concentration of 1.0-4.0 M, and the boric acid at a concentration of 0.01-1.0 M, optionally glycine at a concentration of 0.01-3.0 M, and optionally the $FeCl_3$ at a concentration of 0.1-1.0 M.

9. The battery system of claim 1 wherein a pH of the positive electrolyte is in a range of −1 to 3 and a pH of the negative electrolyte is in a range of 0 to 5.

10. The battery system of claim 1 wherein a pH of the positive electrolyte is in a range of 0 to 2 and a pH of the negative electrolyte is in a range of 1 to 4.5.

11. The battery system of claim 1 wherein the polysaccharide polymer comprises chitosan, sodium alginate, potassium alginate, calcium alginate, ammonium alginate, alginic acid, sodium hyaluronate, potassium hyaluronate, calcium hyaluronate, ammonium hyaluronate, hyaluronic acid, dextran, pullulan, carboxymethyl curdlan, sodium carboxymethyl curdlan, potassium carboxymethyl curdlan, calcium carboxymethyl curdlan, ammonium carboxymethyl curdlan, κ-carrageenan, λ-carrageenan, τ-carrageenan, carboxymethyl cellulose, sodium carboxymethyl cellulose, potassium carboxymethyl cellulose, calcium carboxymethyl cellulose, ammonium carboxymethyl cellulose, pectic acid, chitin, chondroitin, xanthan gum, or combinations thereof.

12. The battery system of claim 1 wherein the hydrophilic ionomeric polymer is a polyphosphoric acid-complexed chitosan polymer, a polyphosphoric acid and metal ion-complexed chitosan polymer, a metal ion-complexed alginic acid polymer, a sodium alginate polymer, an alginic acid polymer, a hyaluronic acid polymer, or combinations thereof, where in the metal ion is ferric ion or ferrous ion.

13. The battery system of claim 1 wherein the hydrophilic ionomeric polymer is a boric acid-complexed polyvinyl alcohol polymer, a boric acid-complexed alginic acid, or a blend of boric acid-complexed polyvinyl alcohol and alginic acid polymer.

14. The battery system of claim 1 wherein the support membrane comprises polyethylene, polypropylene, polyamide, polyacrylonitrile, polyethersulfone, sulfonated polyethersulfone, polysulfone, sulfonated polysulfone, poly(ether ether ketone), sulfonated poly(ether ether ketone), polyester, polyvinylidene fluoride, carbon, polycarbonate, cellulose, acrylic, phenolic, cellulose acetate, cellulose triacetate, polybenzimidazole, or combinations thereof.

15. The battery system of claim 1 wherein the hydrophilic ionomeric polymer is present in the micropores of the support membrane.

16. A redox flow battery system comprising:
at least one rechargeable cell comprising a positive electrolyte, a negative electrolyte, and an ionically conductive thin film composite (TFC) membrane positioned between the positive electrolyte and the negative electrolyte, the positive electrolyte in contact with a positive electrode, and the negative electrolyte in contact with a negative electrode;
the TFC membrane comprising a microporous support membrane and a hydrophilic ionomeric polymer coating layer on a surface of the microporous support membrane, wherein the hydrophilic ionomeric polymer coating layer is ionically conductive;
the positive electrolyte consisting essentially of $FeCl_2$ at a concentration of 1.0-4.5 M, KCl at a concentration of 1.0-3.5 M, HCl at a concentration of 0.05-2.5 M, and glycine at a concentration of 0.01-3.0 M, optionally boric acid at a concentration of 0.01-1.0 M, and optionally $FeCl_3$ at a concentration of 0.1-1.0 M; and
the negative electrolyte consisting essentially of $FeCl_2$ at a concentration of 1.0-4.5 M, KCl at a concentration of 1.0-3.5 M, and boric acid at a concentration of 0.01-1.0 M, optionally glycine at a concentration of 0.01-3.0 M, and optionally $FeCl_3$ at a concentration of 0.1-1.0 M;
wherein the hydrophilic ionomeric polymer comprises a polyphosphoric acid-complexed polysaccharide polymer, a polyphosphoric acid and metal ion-complexed polysaccharide polymer, a metal ion-complexed polysaccharide polymer, a boric acid-complexed polysaccharide polymer, an alginate polymer, an alginic acid polymer, a hyaluronic acid polymer, a boric acid-complexed polyvinyl alcohol polymer, polyphosphoric acid-complexed polyvinyl alcohol polymer, a polyphosphoric acid and metal ion-complexed polyvinyl alcohol polymer, a metal ion-complexed polyvinyl alcohol polymer, a metal ion-complexed poly(acrylic acid) polymer, a boric acid-complexed poly(acrylic acid) polymer, a metal ion-complexed poly(methacrylic acid), a boric acid-complexed poly(methacrylic acid), or combinations thereof; and wherein metal ion is ferric ion or ferrous ion.

17. A redox flow battery system comprising:
at least one rechargeable cell comprising a positive electrolyte, a negative electrolyte, and an ionically conductive thin film composite (TFC) membrane positioned between the positive electrolyte and the negative electrolyte, the positive electrolyte in contact with a positive electrode, and the negative electrolyte in contact with a negative electrode;

the TFC membrane comprising a microporous support membrane and a hydrophilic ionomeric polymer coating layer on a surface of the microporous support membrane, wherein the hydrophilic ionomeric polymer coating layer is ionically conductive;

the positive electrolyte consisting essentially of $FeCl_2$ at a concentration of 1.0-4.5 M, $NH_4Cl$ at a concentration of 1.0-4.0 M, HCl at a concentration of 0.05-2.5 M, and glycine at a concentration of 0.01-3.0 M, optionally boric acid at a concentration of 0.01-1.0 M, and optionally $FeCl_3$ at a concentration of 0.1-1.0 M; and the negative electrolyte consisting essentially of $FeCl_2$ at a concentration of 1.0-4.5 M, $NH_4Cl$ at a concentration of 1.0-4.0 M, and boric acid at a concentration of 0.01-1.0 M, optionally glycine at a concentration of 0.01-3.0 M, and optionally $FeCl_3$ at a concentration of 0.1-1.0 M;

wherein the hydrophilic ionomeric polymer comprises a polyphosphoric acid-complexed polysaccharide polymer, a polyphosphoric acid and metal ion-complexed polysaccharide polymer, a metal ion-complexed polysaccharide polymer, a boric acid-complexed polysaccharide polymer, an alginate polymer, an alginic acid polymer, a hyaluronic acid polymer, a boric acid-complexed polyvinyl alcohol polymer, polyphosphoric acid-complexed polyvinyl alcohol polymer, a polyphosphoric acid and metal ion-complexed polyvinyl alcohol polymer, a metal ion-complexed polyvinyl alcohol polymer, a metal ion-complexed poly(acrylic acid) polymer, a boric acid-complexed poly(acrylic acid) polymer, a metal ion-complexed poly(methacrylic acid), a boric acid-complexed poly(methacrylic acid), or combinations thereof; and wherein metal ion is ferric ion or ferrous ion.

* * * * *